United States Patent
Smith et al.

[11] Patent Number: 6,023,986
[45] Date of Patent: Feb. 15, 2000

[54] MAGNETIC FLUX LEAKAGE INSPECTION TOOL FOR PIPELINES

[75] Inventors: Jim W. K. Smith; Burn Ross Hay, both of Calgary, Canada

[73] Assignee: BJ Services Company, Houston, Tex.

[21] Appl. No.: 09/046,151

[22] Filed: Mar. 23, 1998

Related U.S. Application Data

[60] Provisional application No. 60/042,339, Mar. 24, 1997.

[51] Int. Cl.$^7$ .................................................. G01M 19/00
[52] U.S. Cl. ...................... 73/866.5; 324/220; 701/214; 342/459
[58] Field of Search ............................... 73/866.5, 865.8, 73/592, 623, 637, 638; 701/213–216; 324/220, 221; 342/357, 459

[56] References Cited

U.S. PATENT DOCUMENTS

| | | | |
|---|---|---|---|
| 2,860,356 | 11/1958 | Matheny | 15/104.06 |
| 3,036,530 | 5/1962 | Mills et al. | 104/155 |
| 3,087,439 | 4/1963 | Petrocokino | 104/138 |
| 3,088,491 | 5/1963 | En Dean | 137/802 |
| 3,147,773 | 9/1964 | Matthews et al. | 137/637 |
| 3,495,546 | 2/1970 | Brown et al. | 104/155 |
| 3,496,588 | 2/1970 | Ver Nooy | 15/104.06 |
| 3,758,050 | 9/1973 | Watts et al. | 243/32 |
| 4,105,972 | 8/1978 | Smith | 324/220 |
| 4,114,835 | 9/1978 | Alexandrov et al. | 243/32 |
| 4,295,632 | 10/1981 | Engelke | 251/127 |
| 4,365,379 | 12/1982 | Neff | 15/104.06 R |
| 4,388,871 | 6/1983 | Braithwaite et al. | 104/138 G |
| 4,576,097 | 3/1986 | Foster | 104/138 G |
| 4,727,329 | 2/1988 | Behr | 324/345 |
| 4,769,598 | 9/1988 | Krieg et al. | 324/219 |
| 4,945,775 | 8/1990 | Adams et al. | 73/865.8 |
| 5,208,936 | 5/1993 | Campbell | 15/104.061 |
| 5,739,420 | 4/1998 | Peterson | 73/40.5 R |
| 5,742,517 | 4/1998 | Van Den Bosch | 324/512 X |

OTHER PUBLICATIONS

Sawyer, Tom, et al., Advances in Magnetic Flux Leakage Inspection Tools for Gas Transmission Pipelines, Dec. 2–4, 1996, pp. 1–21.

Mochizuki et al Abstract of Japanese Patent Document No. 9–26060 Published Jan. 28, 1997 "Piping Information Management Method and Controller for Fusing Resin Pipe used in the Method" by JPO & Japio.

*Primary Examiner*—Thomas P. Noland
*Attorney, Agent, or Firm*—Arnold White & Durkee

[57] ABSTRACT

The present invention includes a pipeline feature or defect location system including an in-line inspection tool, an inertial navigation system (INS), control points for use with a global positioning system (GPS) and an INS, and a computer programmed with post processing software. Once the longitude, latitude and elevation of the pipeline feature or defect is identified using the in-line inspection system of this invention. The longitude latitude, and elevation of the pipeline feature or defect can be identified by the INS. An efficient method for improving the accuracy of the identified longitude, latitude and elevation of the pipeline feature or defect is by adjusting the geographic coordinates to those determined by using a GPS.

Data collected from the pipeline feature or defect location system may be incorporated into geographic information service software.

19 Claims, 4 Drawing Sheets

```
Datum and Projection
a       =   6378137.000 in
b       =   6356762.314 in
CU [de?] =      -113.000
False N  =         0.000 in
False E  =    500000.000 in
Scale F  =     0.99960000
```

| LIMITS: | START(N)    | END (N)     |
|---------|-------------|-------------|
| East    | 870183.87   | 670408.18   |
| North   | 5712281.10  | 6711333.87  |

| LIMITS: | START(N)  | END (N)   |
|---------|-----------|-----------|
| Elev    | 1236.74   | 1254.71   |
| H Chain | 28481.17  | 27456.88  |
| S Chain | 28499.99  | 27489.00  |

Geographical Plot Of Inline Inspection Features
Run: Sept._16_97  Date: Mar 10.10
Page 3

FIG. 2A

MAGNETIC FLUX LEAKAGE INSPECTION TOOL FOR PIPELINES

This application claims priority of provisional application 60/042,339 filed on Mar. 24, 1997.

BACKGROUND OF THE INVENTION

The present invention relates to a feature or defect-location system including an in-line-inspection tool having an inertial navigation system (INS) and ties to a global positioning system (GPS). The present invention provides an accurate method of determining the location of pipeline features or defects detected by in-line-inspection tools such as magnetic flux leakage inspection tools (MFL) by comparing in-line-inspection data with inertial navigation system data and adjusting the inertial navigation system data to the accuracy of data collected from a global positioning system.

Pipelines must be monitored for changes in integrity, so that defects can be corrected before pipeline failure occurs. Various monitoring systems have been used to inspect internal pipeline walls and investigate the structural integrity of the pipeline walls.

While there are many different types of inspection tools, commonly known as "pigs," the most common types in use today may be classified generally as either geometry tools or metal loss tools.

Metal loss tools are often referred to as in-line inspection tools. In-line inspection tools are generally used to measure the pipeline wall thickness to detect any changes that may ultimately result in failure if left untended.

Geometry tools detect, measure and locate changes in the internal cross section of a pipeline. They are typically used prior to in-line inspection to ensure that the in-line-inspection instrument will pass safely through the pipeline and to collect data that helps in interpreting the information gathered by in-line inspection tools.

Two in-line inspection techniques are available for wall thickness measurement, namely magnetic flux leakage (MFL) and ultrasonic. Ultrasonic pigs require introduction of a liquid into a pipeline to couple the sensor signal to the pipe wall and are thus generally excluded from inspecting gas pipelines. The MFL method involves inducing a magnetic field into the pipe wall and sensing leakage of the field inside the pipe as the wall thickness changes. The MFL technique is the most commonly used technique to inspect large diameter gas transmission lines.

Once a severe or critical defect has been characterized, it must be located in the field so that the pipeline may be excavated and repaired. Most MFL, tools use some sort of above ground marker system to create a reference point along the pipeline. These markers are generally placed anywhere from one to two kilometers apart along the length of the pipeline. For example, timer boxes that include very accurate clocks may be placed above ground every one to two kilometers. When a pig passes under the ground beneath the timer box, sensors in the timer box sense the magnetic signal from the pig and the time the pig passes underneath the timer box is noted. The distance the pig travels between each marker is measured by the odometer wheels on the sides of the pig, and these measurements may be correlated with the features or defects identified by an in-line inspection tool and the time that the pig passes under each timer box. By determining how far the pig has traveled between the markers as measured by the odometer wheels to the identified feature or defect, the location of the feature or defect may be estimated.

Odometer measurements, however, may not be a very reliable method of determining the location of pipeline defects because of typical mechanical breakdowns inherent in most movable parts that may result in odometer wear and slippage, as well as horizontal chaining errors. The harsh operating environment within subterranean pipelines along with the long duration runs that MFL tools must endure tend to accelerate the wear and tear on the movable mechanical parts. In addition, the above ground markers are not always accurate and must be deployed during the inspection. Their deployment and maintenance are also very labor intensive.

There is a need for a more accurate, more reliable, and less labor intensive system for determining the location of features or defects in a pipeline.

SUMMARY OF THE INVENTION

This invention concerns a method for determining the position of underground pipeline features or defects in terms of GPS coordinates. This is accomplished by use of a pipeline feature or defect location system comprising an in-line inspection system an inertial navigation system, a global positioning system and a computer including post-processing software.

The present invention incorporates a strap down inertial navigation system to determine position and attitude of the pig along its trajectory within the pipe. Three axis gyros and accelerometers combined with odometer information are used to determine three dimensional changes in the pig's position on earth as it travels through the pipeline. Actual geographic coordinates are calculated by establishing Global Positioning System (GPS) control points along the pipeline every five to ten kilometers and then "tying" the inertial data to these points. By transforming the pig's trajectory into the tie points, accurate "real world" nothings, eastings, and heights (latitude, longitude and elevation) can be obtained for any point along the pipe.

More particularly the method for inspecting the integrity of a pipeline includes in-line inspection along the length of the pipeline using a pipeline pig that includes a pipeline inspection tool and an inertial navigation system. The pig is capable of identifying features or defects along the pipeline by use of the in-line inspection tool and collecting data regarding the pipeline features or defects. The position and attitude of the pig along its trajectory is determined within the pipeline using an inertial navigation system. Geographic coordinates of control points along the pipeline are established using an inertial navigation system. The geographic coordinates of the control points are also determined using a global positioning system. The inertial navigation system geographic coordinates of the control points are adjusted to the accuracy of the global positioning system geographic coordinates of the control points. The location of the features and defects between control points may be coordinated with the GPS control point data or corrected inertial navigation control point data to determine GPS geographic coordinates for those points.

These coordinates may be used by repair crews to identify the latitude, longitude and elevation of the location of the feature or defect identified by the in-line inspection tool. The crews may verify the location by using a global positioning system and a global positioning system receiver to insure they have arrived at the latitude, longitude and elevation directly above the identified feature in the pipeline. If the feature of interest is a defect, the crews can then excavate the defect and repair it.

DETAILED DESCRIPTION OF THE PREFERRED EMBODIMENTS

Figure 1:
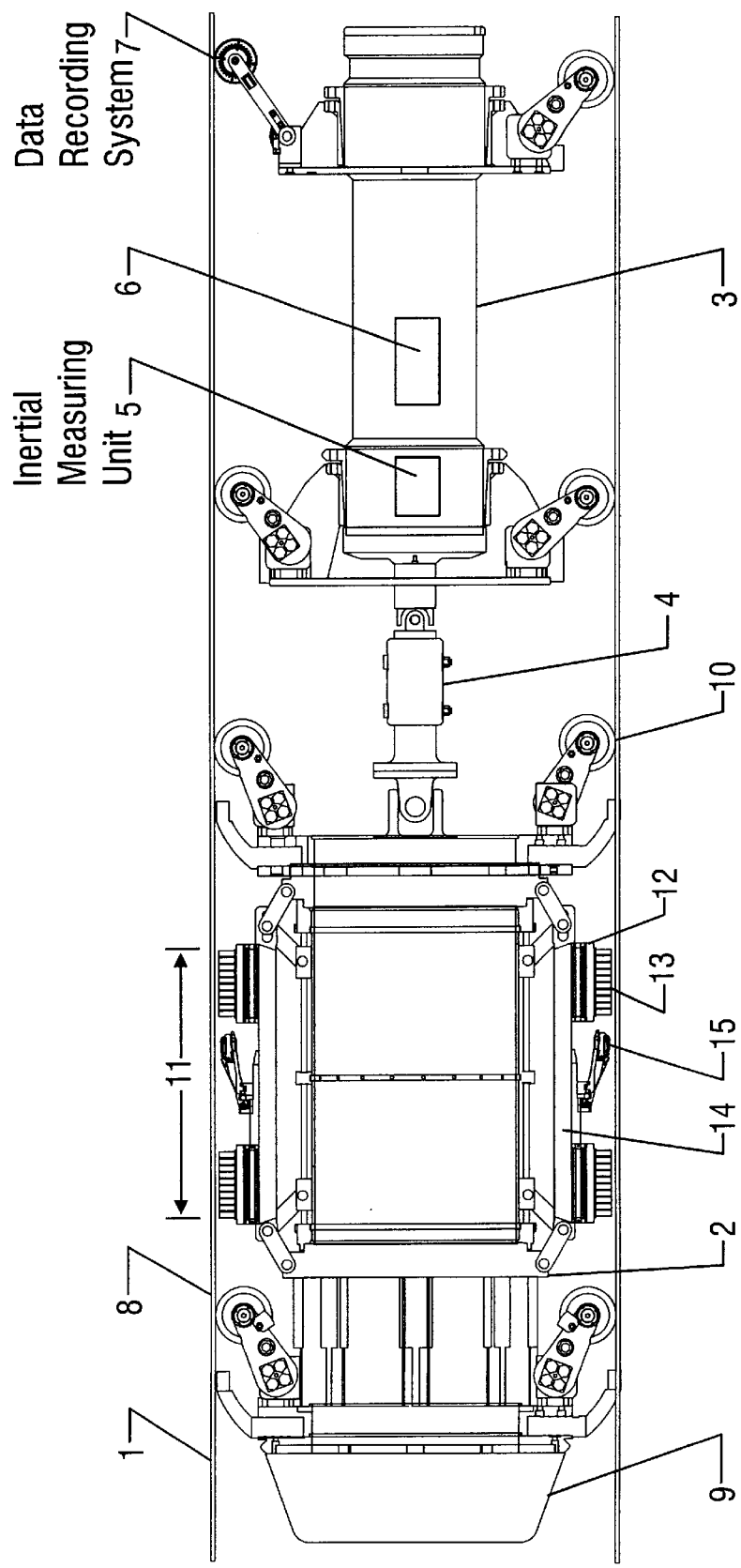
FIG. 1 is a cross-sectional view of a magnetic flux leakage metal loss inspection tool and an inertial navigation system in accordance with the present invention.

The present invention includes a pipeline feature or defect location system including an in-line inspection tool, an inertial navigation system (INS), control points for use with the in-line inspection tool, the global positioning system (GPS) and the INS, and a computer programmed with post processing software.

In-line Inspection Tool

The present invention is not limited to any particular in-line inspection tool. The location of a feature or defect in a pipeline that is identified by any type of in-line inspection tool may be determined by correlating data collected from an in-line-inspection tool with longitude, latitude, and elevation data collected from an INS and adjusting the data from the INS to the accuracy of longitude, latitude, and elevation data collected at some point or points along the pipeline by using a GPS.

Preferred in-line-inspection tools include magnetic flux leakage (MFL) inspection tools and ultrasonic in-line inspection tools. Examples of MFL tools are included in U.S. Pat. No. 4,945,775, issued to Adams et al, U.S. Pat. No. 4,769,598 issued to Krieg et al and the paper that is part of provisional application 60/042,339 entitled "Advances in Magnetic Flux Leakage Inspection Tools for Gas Transmission Pipelines" presented by Tom Sawyer in Kuala Lumpur, Malaysia on December 2–4, 1996.

Inertial Navigational System (INS)

An Inertial Navigation System may be comprised of an Inertial Measurement Unit (IMU) and post processing software loaded on a computer that may be used to perform the navigation function.

One preferred embodiment of an IMU is a strap down unit that may contain three angular rotation sensors (gyroscopes) and accelerometers mounted in three orthoganal axis. Gyroscopes measure angular changes while accelerometers measure acceleration. The raw measurements from the IMU are recorded at a rate of multiple samples per second and are time tagged with the system time. Data from the gyroscopes and accelerometers may be used by a post-processing software program to compute the geographic coordinates, elevation and attitude of the tool during the inspection.

An IMU may be used to determine three dimensional changes in a pig's position on earth as the pig travels through a pipeline. IMU's measure the deflection of a pig as it rides over a bend in a pipeline. This data provides information regarding bends and other physical anomalies within a pipeline. The location of bends within specific metal loss regions may be determined by correlating inertial deflection information with in-line feature or defect detection or MFL data.

The present invention is not limited to any particular software package. Preferred post-processing software incorporates Kalman filter estimation body axis transformations, navigation computation and coordinate transformation to compute the position and attitude of the tool at each new sample. Position and attitude data is written to a database that can be accessed by time or distance keys. All of the aforementioned software routines are well known in the art.

The use of a preferred inertial navigation system with geometric pigs is disclosed in U.S. Pat. No. 4,945,775, issued to Adams et al., the disclosure of which is incorporated by reference herein.

FIG. 1—MFL Inspection Tool with INS

An example of a preferred magnetic flux leakage metal loss inspection tool with an inertial measurement unit is presented in FIG. 1.

Turning to FIG. 1, a magnetic flux leakage pipeline inspection tool is shown in accordance with the present invention in the form of a two-component tool for traveling through a pipeline (1) of predetermined diameter. The tool comprises at least two carriers, (2) and (3), connected by a universal joint (4). The first carrier (2) may house the components of the basic MFL tool. comprising magnetic sensors. The second carrier (3) may support the inertial measurement unit (5), a data recording system (6), and an optional odometer unit including odometer wheels (7) supported by spring-loaded arms.

The carriers may be substantially cylindrical, and may have a diameter somewhat smaller than the pipeline being inspected. The carriers may consist of any paramagnetic material, such as high-grade stainless steel, brass or plastic materials. etc. The carriers are somewhat rigid, with hollow interiors for housing the various MFL and navigational components. An MFL carrier may include a pig rubber (8) which is a well-known cup-shaped flange extending circumferentially around the carrier and is adapted to receive a flow of fluid such as oil or gas within the pipeline (1) and in response to propel the MFL, tool through the pipeline. The foremost carrier (2) may include a tapered nose cone (9) for effective introduction of the unit into check valves and other pipeline fittings. Each carrier may also have a set of rollers (10) that provide support for the carriers while traveling through the pipeline. In the illustrated embodiment, each carrier has a set of front and rear rollers, with each set comprising four rollers distributed somewhat uniformly around the circumference of the carrier.

A magnetic circuit for pipeline inspection may be constructed by separating magnets (or poles) over a given length (11) and coupling the magnets (12) to the wall (1) via pliable steel brushes (13). The circuit is completed by a backing bar (14). Flux leakage may be measured by placing sensors (15) adjacent to the pipe wall within the magnetic circuit. Magnetic assemblies of sensors (15) are repeated radially around a pig to provide complete circumferential coverage. Electromagnetic or permanent magnets may be used. Preferred in-line inspection tools of this invention measure internal and external metal loss with hall effect and eddy current sensors.

Global Positioning System (GPS)

The present invention is not limited to any particular GPS. Generally, a GPS may be used to determine the location of a receiver by computing the difference between the time that a signal is sent from a global positioning satellite and the time it is received. GPS satellites carry atomic clocks that provide extremely accurate time. The time information may be placed in the codes broadcast by the satellite so that a receiver may continuously determine the time the signal was broadcast. The signal contains data that a receiver may use to compute the locations of the satellites and to make other adjustments needed for accurate positioning. The receiver may use the time difference between the time of signal reception and the broadcast time to compute the distance, or range, from the receiver to the satellite. The receiver may account for propagation delays, or decreases in the signal's speed caused by the ionosphere and the troposphere. A receiver may be attached to a timer box or any other above ground landmark or may be mobile. With information about the ranges from at least three satellites and the location of the satellite when the signal was sent, preferred receivers can compute their own three-dimensional position (latitude, longitude, and elevation). An atomic clock synchronized to a GPS may be used to compute ranges from the three signals. By taking a measurement from a fourth satellite, the receiver avoids the need for an atomic clock. Thus, the receiver may use four or more satellites to compute latitude, longitude, altitude, and time.

Control Points

A control point is a location that can be identified both above ground and underground by an in-line inspection tool. A series of control points spaced at periodic intervals may be established along a pipeline. A preferred embodiment of this invention uses control points placed at about five to ten km intervals. This is a vast improvement over the one to two km intervals commonly used before this invention. A five to ten km interval between control points saves time and cost. Smaller crews can be used to set up the control points and fewer control points can be used. These control points may be features in the pipeline that can be detected both by the sensors in the in-line inspection tool and identified visually on the surface. Examples of such features may include valves, tees, cathodic protection anodes, bends, etc.

Timer Boxes or above Ground Markers (AGM's) as Control Points

Where no identifiable features are available, AGM sites can be used as control points, or AGM sites and identifiable features can both be used as control points along a pipeline. The methods of the invention are not restricted to any particular AGM. Generally, AGMs are portable devices that may include an accurate clock synchronized to the time in the in-line inspection tool, a magnetic sensor capable of detecting the magnetic field generated by the passage of the in-line inspection tool and a recording system. When placed on the ground directly above the pipeline, the AGM will log the time the tool passes when the magnetic field sensor indicates that the tool has passed by. As the clocks in the AGM and the tool are synchronized, the position of the AGM in the tool data may be identified by examining the tool data at the time the AGM detected the passage.

Differential GPS

The control points along the pipeline may be surveyed using differential GPS to more accurately obtain the coordinates of the control points or the AGMs in latitude, longitude and elevation or a suitable mapping plane for the pipeline being inspected. Accuracy in detecting the location of a single GPS receiver at one of the control points is plus or minus 50 meters. This accuracy may be improved to less than plus or minus one meter using differential GPS. Differential GPS is the preferred method for determining the latitude, longitude and elevation of the control points of this invention.

Differential GPS systems use one or more GPS reference stations set on known survey points to determine corrections to apply to the mobile GPS receiver readings such as those taken at the control points of this invention. The comparison of the GPS reference station readings and the readings taken at the mobile receivers improves the accuracy of the latitude, longitude, and elevation reading of the mobile receiver readings to plus or minus one meter. Preferred differential GPS systems are known in the art and are commercially available from companies such as Trimble, Ashtech and others.

Tying INS Coordinates To GPS Coordinates

Inertial navigation systems tend to accumulate errors with time and/or distance traveled. Uncontrolled, these errors will increase to the point where the inertial coordinates are tens or even hundreds of meters different form the correct position. Such errors are unacceptable when the position data is to be used to locate defects or features found by the in-line-inspection tool. GPS control points are used to control the error growth in the inertial coordinates. The position errors of the GPS coordinates for the control points is less than plus or minus one meter. When adjusted to GPS, the errors in the inertial coordinates are reduced to less than one part in 2000 or better from the nearest control point. For example, an adjusted inertial coordinate 4000 meters from the nearest control point will be accurate to approximately plus or minus two meters.

INS latitude, longitude, and elevation coordinates may be tied to GPS latitude. longitude, and elevation coordinates by first comparing the two and then adjusting the INS coordinates to the accuracy of the GPS coordinates. As the control points and AGMs have both GPS coordinates and INS coordinates. the errors between the two coordinate systems between successive control points may be determined in terms of scale factor (distance error) and rotation (azimuth error). The INS coordinates for the pipeline between successive control points may then be adjusted to the accuracy of the coordinates of the GPS data by applying the scale factor and rotation determined from the control points on either side of the section of pipeline.

Following is a description of a preferred adjustment method using mapping plane coordinates. Scale factor may be computed by calculating the inertial distance between the inertial coordinates of two successive control points (P1 and P2) and the GPS distance between the GPS coordinates of the same control points. The scale factor is:

$$\text{Scale factor} = \frac{\text{GPS distance}}{\text{Inertial distance}}$$

Rotation angle may be computed by calculating the inertial azimuth between the same two inertial coordinates and the GPS azimuth between the same two GPS coordinates. The rotation angle is:

rotation angle=GPS azimuth−inertial azimuth

Inertial coordinates for points between control points P1 and P2 may be adjusted to GPS by computing the inertial distance (Id) and azimuth (Iaz) between the inertial coordinate of P1 and the inertial coordinate of the point. The adjusted inertial coordinates are then computed as follows:

Adjusted North=GPS North P1+Id×scale factor×cosine (Iaz+rotation angle)

Adjusted East=GPS East P1+Id×scale factor×sine (Iaz+rotation angle)

Once the INS coordinates have been adjusted to the accuracy of the GPS coordinates, the position of any features or defects identified by the in-line inspection tool may also be located in terms of GPS coordinates. Such GPS coordinates include latitude, longitude and elevation or nothings, castings, and elevation. Once these adjustments have been made, GPS coordinates for any features or defects identified by the in-line inspection tool may be determined.

By use of a mobile GPS receiver and the knowledge of the latitude, longitude and elevation of a defect, a crew can be sent to the location with the identified coordinates which is directly above the pipeline defect. The mobile GPS receiver can be used to verified that that crew is directly above the pipeline defect. Then the pipeline can be excavated and the defect repaired.

Incorporating Data in Geographic Information Systems (GIS)

The methods of this invention do not require incorporation of data in a GIS, but this may be an added feature. The invention is not limited to the use of any particular GIS system. Generally, a GIS is a computer system that records, stores, and analyzes information about the features that make up the earth's surface. A GIS may generate two- or three-dimensional images of an area showing natural features. GIS software is designed to accept geographic data from a variety of sources. Since the final processed INS and GPS data of the present invention is in geographic coordinate form the data may be readily incorporated into a Geographic Information System (GIS) or an automated mapping/facilities management (AM/FM) system.

The following example illustrates the invention but should not be construed to limit the scope thereof unless otherwise expressly noted.

EXAMPLE 1

Figure 2:
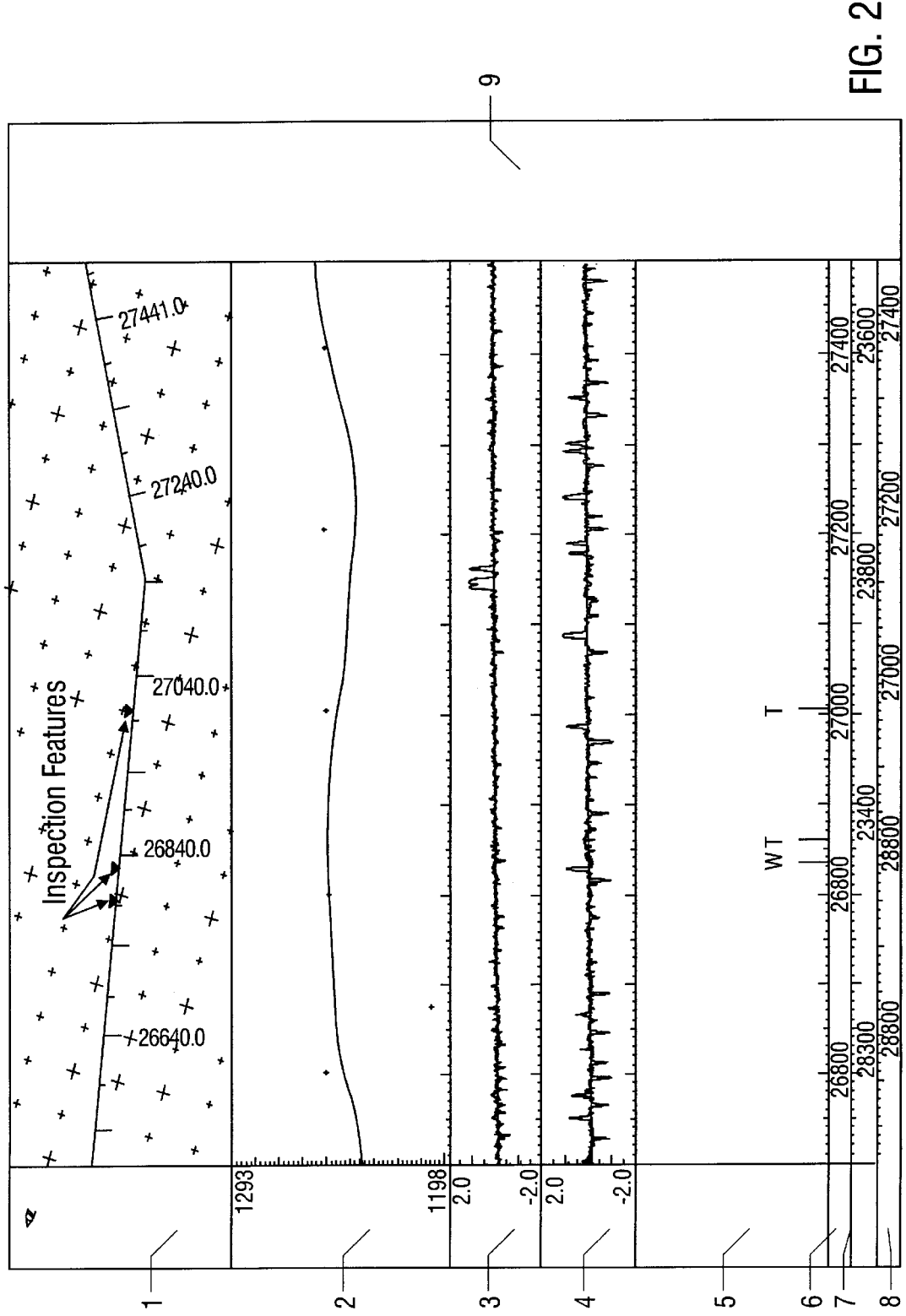
FIG. 2 is a plot of pipeline position and features using data collected by an in-line-inspection tool in accordance with the present invention.
Figure 3:
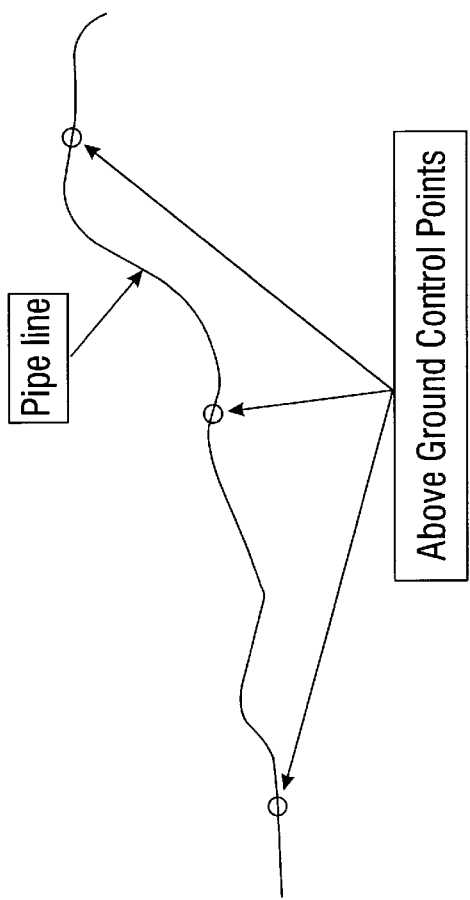
FIG. 3 is a plot showing the relative location of the above ground control points along the pipeline.
Figure 4:
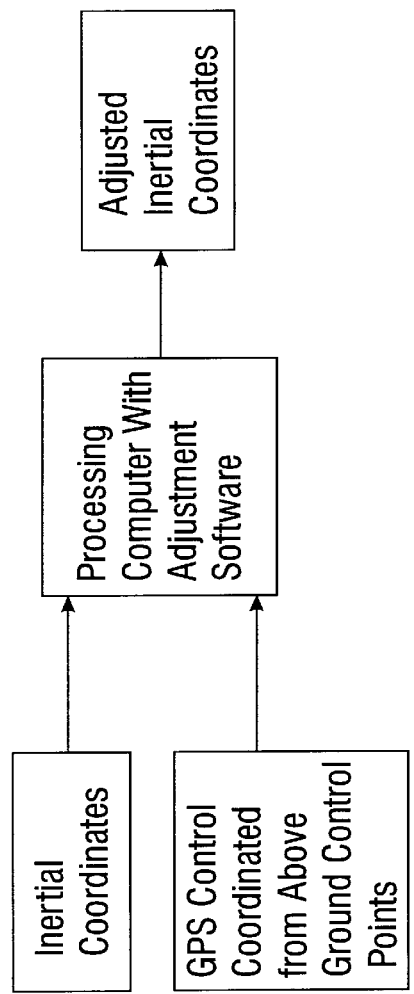
FIG. 4 is a schematic representation of how incoming data flows through the processing computer and results in adjusted inertial coordinates.

Correlation of In-line-Inspection Data, Inertial Navigational Data and GPS Data FIG. 2, including panels 1–9, is a plot of pipeline position and features using data collected by an in-line-inspection tool. It illustrates the use of the inertial navigation data which has been adjusted to GPS coordinates to correctly and accurately position the pipeline and any features found by the in-line-inspection tool in geographic coordinates. All distance units shown in this example are in meters but others (feet) may be used instead.

In this example, the GPS control points are 4.2 km downstream and 3.9 km upstream of the area shown.

FIG. 2 Panel (1) shows the plan view of the pipeline. The pipeline is plotted in geographic coordinates. Grid marks depict a mapping plane, in this case, Universal Transverse Mercator (UTM). Distance ticks along the pipeline are shown to allow data in the other panels to be related. The scale of the plot shown is 1:5000. Major tick marks are at 100 meter intervals, while minor tick marks are at 50 meter intervals. A North arrow shows the azimuth orientation.

FIG. 2 Panel (2) shows profile or elevation plot of the pipeline. The horizontal scale is 1 to 5,000 and the vertical scale is 1 to 1,000. The elevation in meters can be directly read from the tick marks.

FIG. 2 Panel 3 shows any horizontal bends in the pipeline. The direction of the bends are shown as left (+) or right (−).

FIG. 2 Panel 4 shows any vertical bends in the pipeline. The direction of the bends are shown as up (+) or down (−).

Curvature units are in percent strain which is defined as:

$$100 \times \frac{\text{curve radius}}{\text{pipe radius}} = \text{percent strain}$$

FIG. 2 Panel 5 shows the location of features in the pipeline detected by the in-line inspection tool (W, T, T) These features have both chainage (distance along the pipeline), geographic coordinates and elevation.

FIG. 2 Panel 6 shows the distance from the start of the pipeline. This is in slope distance.

FIG. 2 Panel 7 shows the time in seconds from the start of the inspection that the features and inertial data are collected. This is used to relate all data collected in the in-line inspection tool as well as to correctly relate the AGM control points to the inertial data.

FIG. 2 Panel 8 shows the horizontal distance from the start of the pipeline.

What is claimed is:

1. A method for determining the position of underground pipeline features or defects in terms of global positioning system coordinates, comprising:

having globally positioned control points along the pipeline;

identifying pipeline features or defects using an in-line inspection tool;

identifying the geographic location of the pipeline features or defects and the globally positioned control points using an inertial navigation system;

adjusting the geographic location determined for the globally positioned control points by the inertial navigation system to the accuracy of the global position of the globally positioned control points;

calculating the geographic location of the features or defects located between the globally positioned control points.

2. The method of claim 1 further comprising incorporating the geographic coordinates of the features or defects located along the pipeline into a geographic information system (GIS) database.

3. A method according to claim 1, further comprising confirming the adjusted geographic location of the feature or defect above ground using a global positioning system and a global positioning receiver.

4. A method according to claim 1, further comprising using a computer having post-processing software used to compare the geographic locations from the inertial navigation system to the geographic locations from the global positioning system and adjust the accuracy of the geographic locations from the inertial navigation system to the accuracy of those from the GPS.

5. A method according to claim 1, wherein the in-line inspection tool comprises a magnetic flux leakage tool.

6. A pipeline feature or defect location system comprising:

an in-line-inspection system;

globally positioned above ground control points placed at intervals along the pipeline, said control points having geographic coordinates from a global positioning satellite;

an inertial navigation system;

a computer including post-processing software.

7. A system of claim 6, wherein:

pipeline features or defects may be identified by using the in-line inspection system;

geographic coordinates of the pipeline features or defects and the control points may be identified by using the inertial navigation system;

the accuracy of the geographic coordinates from the inertial navigation system may be adjusted to the accuracy of the geographic coordinates of the global positioning system.

8. A system of claim 6, wherein the in-line inspection system is a magnetic flux leakage inspection tool.

9. A method for inspecting the integrity of a pipeline comprising:

establishing control points along the pipeline;

inspecting a length of the pipeline using a pipeline pig, wherein the pig includes an in-line inspection tool and an inertial navigation system;

identifying, features or defects along the pipeline by use of the in-line inspection tool;

collecting data regarding the features or defects;

determining the position and attitude of the pig along its trajectory within the pipeline using the inertial navigation system;

collecting data in the form of geographic coordinates regarding the position and attitude of the pig along its trajectory;

determining the geographic coordinates of the control points with the inertial navigation system;

determining the global position satellite coordinates of the control points;

adjusting the geographic coordinates of the control points calculated with the inertial navigation system to the accuracy of those calculated with the global positioning system;

correcting the data collected regarding the position and attitude of the pig determined along its trajectory within the pipeline using the inertial navigation system based on the global position satellite coordinates of the control;

determining geographic coordinates for the features or defects located along the pipeline using the corrected position and attitude of the pig.

10. A method according to claim 9, wherein the global position of the control points is determined using the differential global positioning system.

11. A method according to claim 9, wherein the in-line inspection system is a magnetic flux leakage detection system or an ultrasonic in-line inspection system.

12. The method of claim 9 further comprising incorporating the geographic coordinates of the features or defects located along the pipeline into a geographic information system (GIS) database.

13. A method for locating features or defects in a pipeline, comprising:

setting control points at intervals along the pipeline;

performing in-line inspection of the pipeline using an in-line inspection tool:

wherein said in-line inspection tool includes an inertial navigational system;

recording data from the in-line inspection tool and the inertial navigational system;

determining the position of control points along the pipeline by use of a global positioning system;

recording data from the global positioning system; and tying the data from the in-line inspection system, the data from the inertial navigational system and the data from the global positioning system to determine the location of the features or defects in the pipeline.

14. A method according to claim 13, wherein the in-line inspection system is a magnetic flux leakage inspection tool.

15. A method according to claim 13, wherein the inertial navigational system data is in geographic terminology.

16. A method according to claim 13, wherein the accuracy of the data from the inertial navigational system is adjusted to the accuracy of the data from the global positioning system.

17. A method according to claim 13, wherein the inertial navigational system and the global positioning system provides data points that are latitude, longitude and elevation for points along the pipeline.

18. A method according to claim 13, wherein the data collected entered into GIS database.

19. A method according to claim 13, wherein the position of control points along the pipeline by use of a differential global positioning system.

* * * * *